UNITED STATES PATENT OFFICE.

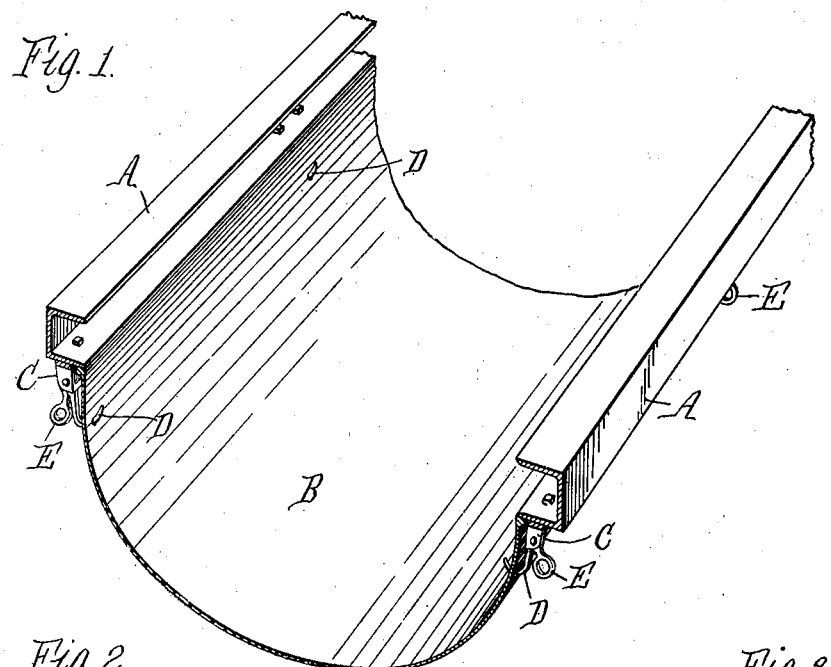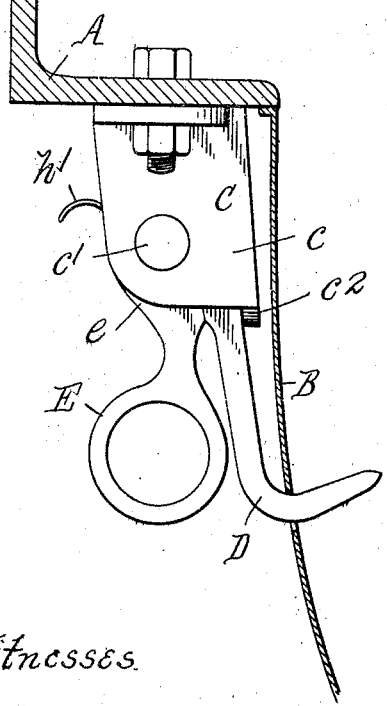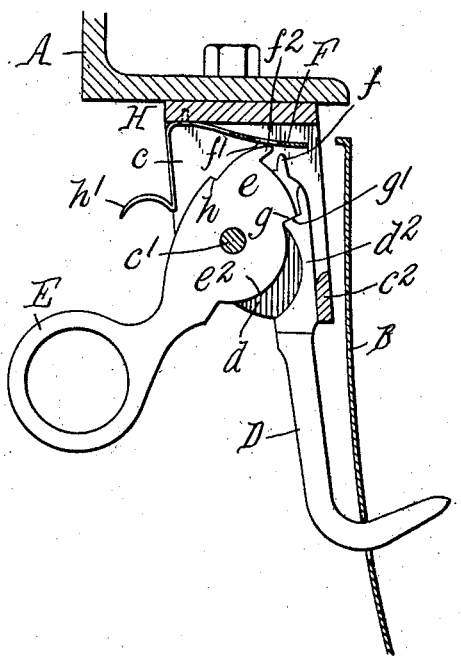

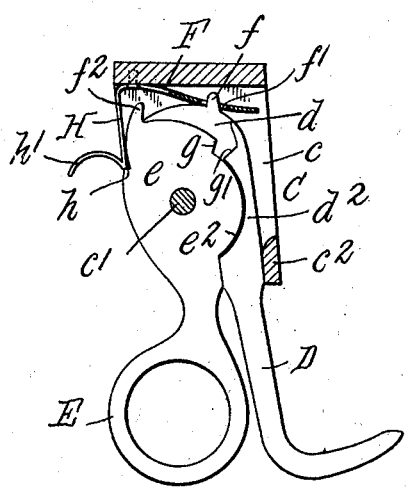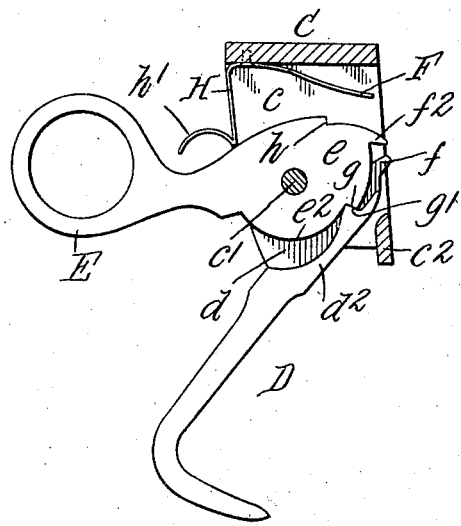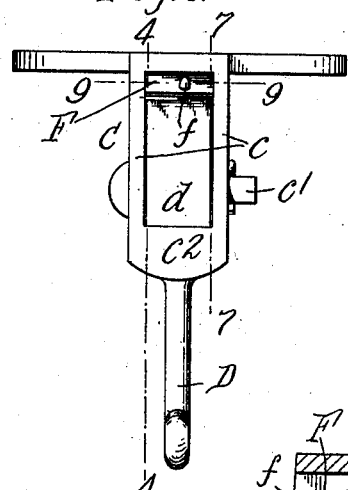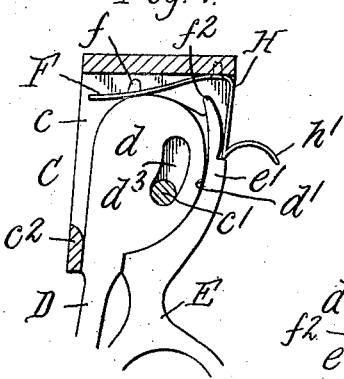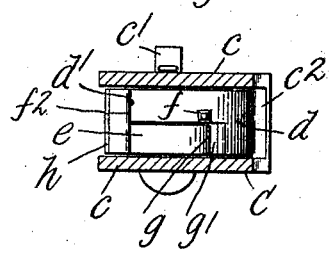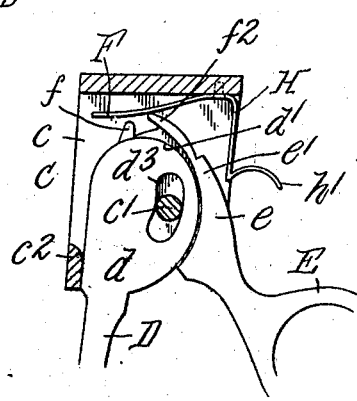

JOHN L. LEDERER, OF BUFFALO, NEW YORK.

SUPPORTING DEVICE.

976,472. Specification of Letters Patent. Patented Nov. 22, 1910.

Application filed December 6, 1909. Serial No. 531,534.

*To all whom it may concern:*

Be it known that I, JOHN L. LEDERER, a citizen of the United States, residing at Buffalo, in the county of Erie and State of New York, have invented a new and useful Improvement in Supporting Devices, of which the following is a specification.

This invention relates more particularly to improvements in supporting devices which are intended for releasably supporting an article and securing it firmly in position and can be readily operated for releasing the article.

The object of this invention is to construct a supporting device of this character in such a manner that by the manipulation of a single operating lever, the supporting hook member can be readily locked in position for supporting an article or can be unlocked and swung to its releasing position to permit the removal of the article; and further, to provide means whereby a single locking movement of the operating lever in one direction produces first a movement of the hook to engage the article and then a movement of the hook whereby the article carried by the hook is clamped firmly in position against some suitable stationary part and the article is thus held rigidly upon the hook.

The device is intended more especially for detachably securing dust and drip pans to the frames of automobiles but its use is not limited to this and it may be employed for various other purposes where a device for releasably securing an article is desired.

In the accompanying drawings, consisting of two sheets: Figure 1 is a fragmentary perspective view, partly in section, of the frame of an automobile having a drip pan secured thereto by supporting devices embodying the invention. Fig. 2 is a fragmentary side elevation thereof, partly in section, on an enlarged scale. Fig. 3 is a similar view, showing the device in its intermediate position with one side of its frame removed. Fig. 4 is a sectional elevation of the supporting device in holding position, on line 4—4, Fig. 6. Fig. 5 is a similar view thereof, showing the parts in their releasing position. Fig. 6 is a front elevation thereof. Fig. 7 is a fragmentary sectional elevation on line 7—7, Fig. 6. Fig. 8 is a similar view, showing the parts in their intermediate position. Fig. 9 is a sectional plan on line 9—9, Fig. 6.

Like letters of reference refer to like parts in the several figures.

A A represent the side bars of the frame of an automobile, and B a dust or drip pan which is suspended beneath the same and is intended to catch and retain oil and other drippings from the engine and other working parts of the automobile and to cover and protect these parts. As it is desirable that these pans be frequently detached from the frame for removing the oil and cleaning them, it is important that they be secured to the frame in such a manner that, while normally held rigidly and immovably in place thereon, they can be easily detached therefrom whenever necessary. For this purpose releasable supporting devices are arranged at intervals along the side bars A for engagement with the opposite side edges of the pan B, and are constructed as follows: Each supporting device comprises a frame C which is bolted or otherwise suitably secured to the frame of the automobile, a supporting hook or member D which engages and supports the drip pan, and an operating lever E for moving the hook, the lever and hook being movably mounted upon the frame C. In the construction shown, the frame C has depending side pieces $c$ $c$ which are spaced apart and are connected by a pivot pin $c'$ and a front cross-bar $c^2$. Between the sides $c$ $c$ are arranged, side by side, the heads or enlarged end portions $d$ and $e$ of the hook D and the lever E. The head $d$ of the hook has a curved rear edge $d'$ which is embraced by a flange $e'$ on the head $e$ of the lever, and the head $e$ has a curved front edge $e^2$ which is embraced by a flange $d^2$ on the head $d$. The lever head $e$ is pivotally mounted on the connecting pin $c'$ of the frame C so that it is free to turn thereon, but is held from endwise movement, while the hook head $d$ has a longitudinal slot $d^3$ through which the pin $c'$ extends and which permits a limited endwise movement of the hook. The edge $d'$ of the hook head is cam-shaped and the flange $e'$ slidably engages this edge so that when the lever is moved forwardly it acts to raise the hook, and when it is moved rearwardly it allows the hook to descend under the weight of the pan. The curved edge $e^2$ of the lever and the flange $d^2$ of the hook are so shaped that when the parts are in the holding position, shown in Fig. 4, they engage and coöperate with the cam edge $d'$ and flange $e'$ to support the hook.

The hook head $d$ is provided on its upper edge with a lug or stud $f$ which is adapted to engage in a hole $f'$ in a locking spring F secured to the frame C to lock the hook in its supporting position, and the lever head $e$ has a releasing projection or cam $f^2$ which is adapted to engage the spring F and move the same out of engagement with the lug $f$ for releasing the hook D. The head $e$ of the lever E is provided with a shoulder $g$ which is adapted to engage a corresponding shoulder $g'$ on the hook head $d$, see Figs. 3–5.

When it is desired to unlock the hook, the lever E is moved rearwardly, bringing its releasing cam $f^2$ in engagement with the spring F and forcing this spring out of engagement with the lug $f$ on the hook, thus unlocking the hook and permitting it to assume the position shown in Figs. 3 and 8. The further movement of the lever, by reason of the engagement of the shoulders $g$ and $g'$, swings the hook back out of engagement with the pan to the position shown in Fig. 5. In locking the hook, the operation is reversed. The hook is moved into engagement with the pan, as shown in Fig. 3, and the operating lever is then moved forwardly to force the hook upwardly into its locked position, as shown in Figs. 2, 4 and 7, under the action of the cam flange $e'$, as explained. This serves to lift the pan and clamp the upper edge thereof firmly against the side bar A. The pan is thus firmly secured upon the hook and held from being thrown off the same by the jar and movement to which it is subjected. The pan can not work loose upon the hook and shift its position and is also held from rattling, which is especially desirable in automobiles where such noise is considered a serious detriment. In releasing the pan, the first portion of the movement of the lever permits the hook to descend and the pan to lower out of engagement with the frame so that the pan can be readily disengaged from the hook. If desired, the lever E may be held in its locking position by a spring H which, in the construction shown, is formed integrally with the hook-locking spring F and is adapted to engage a shoulder $h$ on the lever head $e$. The spring H is preferably provided with a thumb piece $h'$ which can be readily reached and operated to release the spring when the lever is grasped for unlocking the hook.

I claim as my invention:

1. The combination of a hook mounted to swing into and out of engagement with an article and also to move to clamp the article against a supporting part, an operating lever for the hook, coöperating parts on the hook and lever which engage and move the hook for clamping the article when the lever is moved in one direction, means for retaining the hook in its holding position, and means operated by the lever for releasing the hook from the retaining means when the lever is moved in an opposite direction, substantially as set forth.

2. The combination of a hook mounted to swing into and out of engagement with an article and also to move to clamp the article against a supporting part, a spring for retaining the hook in its holding position, an operating lever for the hook, means operated by the lever for releasing the hook from the spring and swinging it out of engagement with the article when the lever is moved in one direction, and means for moving the hook to clamp the article when the lever is moved in the opposite direction, substantially as set forth.

3. The combination of a pivoted lever, a hook mounted to swing toward and from the article and also to move bodily to clamp the article, a spring adapted to engage a projection on the hook to retain the hook in holding position, a part on the lever adapted to engage the spring to release the hook, shoulders on the hook and lever adapted to engage to swing the hook out of engagement with the article, and a cam on the hook adapted to be engaged by the lever for moving the hook bodily to clamp the article, substantially as set forth.

4. The combination of a lever, a pivot therefor, a hook having a slot through which said pivot passes which permits said hook to swing into and out of engagement with an article and also to move bodily to clamp the article, shoulders on the hook and lever adapted to engage to swing the hook out of engagement with the article when the lever is moved in one direction, and cam faces on the hook and lever which engage and move the hook bodily to clamp the article when the lever is moved in an opposite direction, substantially as set forth.

Witness my hand, this 2nd day of December, 1909.

JOHN L. LEDERER.

Witnesses:
A. L. McGee,
E. C. Hard.